(12) United States Patent
Dong et al.

(10) Patent No.: US 10,095,932 B2
(45) Date of Patent: Oct. 9, 2018

(54) VIDEO ABSTRACT USING SIGNED FOREGROUND EXTRACTION AND FUSION

(71) Applicant: SAP SE, Walldorf (DE)

(72) Inventors: Mingjie Dong, Shanghai (CN); Jing Gu, Shanghai (CN)

(73) Assignee: SAP SE, Walldorf (DE)

( * ) Notice: Subject to any disclaimer, the term of this patent is extended or adjusted under 35 U.S.C. 154(b) by 5 days.

(21) Appl. No.: 15/388,525

(22) Filed: Dec. 22, 2016

(65) Prior Publication Data
US 2018/0181814 A1 Jun. 28, 2018

(51) Int. Cl.
| *G06K 9/00* | (2006.01) |
| *G06T 7/194* | (2017.01) |
| *G06T 11/60* | (2006.01) |
| *G06K 9/52* | (2006.01) |
| *G06T 1/60* | (2006.01) |

(52) U.S. Cl.
CPC ..... *G06K 9/00771* (2013.01); *G06K 9/00718* (2013.01); *G06K 9/52* (2013.01); *G06T 1/60* (2013.01); *G06T 7/194* (2017.01); *G06T 11/60* (2013.01); *G06K 2009/00738* (2013.01)

(58) Field of Classification Search
None
See application file for complete search history.

(56) References Cited

U.S. PATENT DOCUMENTS

| 6,026,183 A * | 2/2000 | Talluri ............. G06T 9/20 375/E7.053 |
| 6,614,847 B1 * | 9/2003 | Das ............. H04N 19/537 375/240.15 |
| 9,019,381 B2 * | 4/2015 | Guler ............. G01S 3/7864 348/155 |
| 9,224,045 B2 * | 12/2015 | Land ............. H04N 19/46 |

(Continued)

OTHER PUBLICATIONS

Pritch, Yael et al., "Nonchronological Video Synopsis and Indexing", vol. 30. No. 11, IEEE Transactions on Pattern Analysis and Machine Intelligence, Nov. 2008, DOI: 10.1109/TPAMI.2008.29, (pp. 1971-1984, 14 total pages).

(Continued)

*Primary Examiner* — Nancy Bitar
(74) *Attorney, Agent, or Firm* — Buckley, Maschoff & Talwalkar LLC

(57) ABSTRACT

A video abstract is produced from surveillance camera video by retrieving a frame of the video, updating a background frame based at least in part on the retrieved frame, and performing a video division process which includes extracting, if it is determined that the average gray scale value of the retrieved frame exceeds a defined threshold, foreground data from the retrieved frame after conversion of the retrieved frame to a signed data type. The video division process further includes retrieving a next frame of the video produced by the camera, updating the background frame, and repeating the video division process. The producing of the video abstract further includes merging the foreground (Continued)

data with the updated background data after conversion of the foreground data and the updated background data to the signed data type, and generating a video abstract with the merged foreground and background data.

16 Claims, 9 Drawing Sheets

(56) References Cited

U.S. PATENT DOCUMENTS

| | | | | |
|---|---|---|---|---|
| 9,979,743 | B2* | 5/2018 | Hovor | H04L 63/14 |
| 2005/0185823 | A1* | 8/2005 | Brown | G08B 13/19604 |
| | | | | 382/103 |

OTHER PUBLICATIONS

Communication: "Extended European Search Report", dated Feb. 8, 2018 (dated Feb. 8, 2018), European Patent Office, for European Application No. 17001932.7-1222, 11pgs.

* cited by examiner

|  | FRAME RATE (FPS) | SIZE (PIXEL) | TIME DURATION (sec) |
|---|---|---|---|
| VIDEO 1 | 30 | 640x480 | 1089 |
| VIDEO 2 | 25 | 352x288 | 310 |
| VIDEO 3 | 25 | 352x288 | 884 |
| VIDEO 4 | 25 | 480x360 | 469 |
| VIDEO 5 | 30 | 352x240 | 599 |

FIG.4

|  | $T_c$(sec) | $T_g$(sec) | $S_r$ |
|---|---|---|---|
| VIDEO 1 | 344.75 | 45.76 | 7.53 |
| VIDEO 2 | 34.99 | 5.11 | 6.85 |
| VIDEO 3 | 87.36 | 12.69 | 6.88 |
| VIDEO 4 | 79.78 | 9.74 | 8.19 |
| VIDEO 5 | 94.23 | 13.80 | 6.83 |

FIG.5

| m1 | s1 | m2 | s2 | m3 | s3 | m4 | s4 | m5 |
FIG.7
| m1 | m2 | m3 | m4 | m5 |
FIG.8
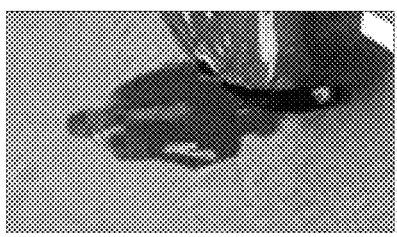
FIG.11
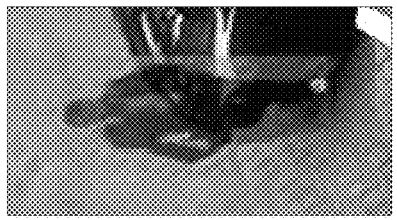
FIG.10

VIDEO ABSTRACT USING SIGNED FOREGROUND EXTRACTION AND FUSION

FIELD OF THE INVENTION

The disclosed embodiments are directed to producing a video abstract from video using signed foreground extraction and fusion. More specifically, the disclosed embodiments are directed to producing a video abstract from surveillance video using signed foreground extraction and fusion with background update calculations being performed using a graphics processing unit.

BACKGROUND

In cities and other localities, there is an increasingly large number of surveillance cameras used in the streets, schools, hospitals, stadiums, and other public places. A large quantity of surveillance video is produced every day, which puts a great deal of pressure on facilities for storing the surveillance video and those who must study the surveillance video, e.g., law enforcement officials.

Conventionally, various processes may be used to generate a video summary from surveillance video. In the generation of a video summary, e.g., a video abstract, based on motive objects, extracting motion foreground objects may be done by first detecting the motion area and cutting the motive object out of the source frame. Then, the motive object picture is integrated into the corresponding background image by erasing the corresponding location on the background picture and putting the motive object image in its place. Because of the effects of light changes, foreground images tend not to blend well into the background, and they leave a clear border shadow, which negatively affects the quality of the generated summary video.

In surveillance video, the most influential factor in the background is light. To adapt a background to the actual environment, an algorithm may be used to update the background. However, due to the large amount of video data in typical installations, and the complexity of the applied algorithms, background updating requires a significant amount of time, which significantly affects the speed of video summary generation.

SUMMARY

The disclosed embodiments are directed to systems and methods for merging foreground motive object images into background images without flaws such as border shadow to generate high quality summary videos (i.e., video abstracts).

In one aspect, the disclosed embodiments provide a system and method for producing a video abstract from video produced by a surveillance video camera. The method includes retrieving a frame of the video produced by the camera, updating a background frame based at least in part on the retrieved frame, performing a video division process to separate static frames from motive frames. The video division process includes retrieving, if it is determined that the retrieved frame is a static frame, a next frame of the video produced by the camera, updating the background frame, and repeating the video division process. The video division process further includes extracting, if it is determined that the retrieved frame is a motive frame, foreground data from the retrieved frame after conversion of the retrieved frame to a signed data type. The method for producing the video abstract further includes determining whether an end of the video produced by the camera has been reached, retrieving, if it is determined that the end of the video produced by the camera has not been reached, a next frame of the video produced by the camera, updating the background frame, and repeating the video division process. The method further includes merging, if it is determined that the end of the video produced by the camera has been reached, the foreground data with the updated background data after conversion of the foreground data and the updated background data to the signed data type, and generating a video abstract with the merged foreground and background data.

BRIEF DESCRIPTION OF THE DRAWINGS

FIG. 4 is a table summarizing the details of videos used in experimental tests;

FIG. 5 is a table summarizing the results of the experimental tests using the videos of FIG. 4 with a single Gaussian model and parallel processing by the GPU;

FIG. 7 shows the structure of a surveillance video having both motive and static segments;

FIG. 8 shows the structure of the surveillance video of FIG. 7 with the static segments removed;

FIG. 10 shows the result of an experiment performed using a surveillance video which was processed to form a video abstract frame without using S-FEF;

FIG. 11 shows the result of an experiment performed using a surveillance video which was processed to form a video abstract frame using the extraction and fusion of foreground by S-FEF.

DETAILED DESCRIPTION

The disclosed embodiments involve the generation of video abstracts, which are a form of video compression. This is an effective method of compressing the video, which will help to solve the video storage problem. As explained in further detail below, the disclosed techniques extract the pertinent contents of a long video and use them to generate a short video, so one can get the contents of concern quickly.

In general, surveillance video is composed of a static background and a dynamic foreground, so it can be divided into dynamic frames (i.e., frames containing motive objects) and static frames (i.e., frames without motive objects) based on the state of frame. Most of the time, the static contents of a video are not of interest, so one can extract motive objects in the dynamic frames and integrate these motive targets into the corresponding background to generate a video abstract.

Figure 1:
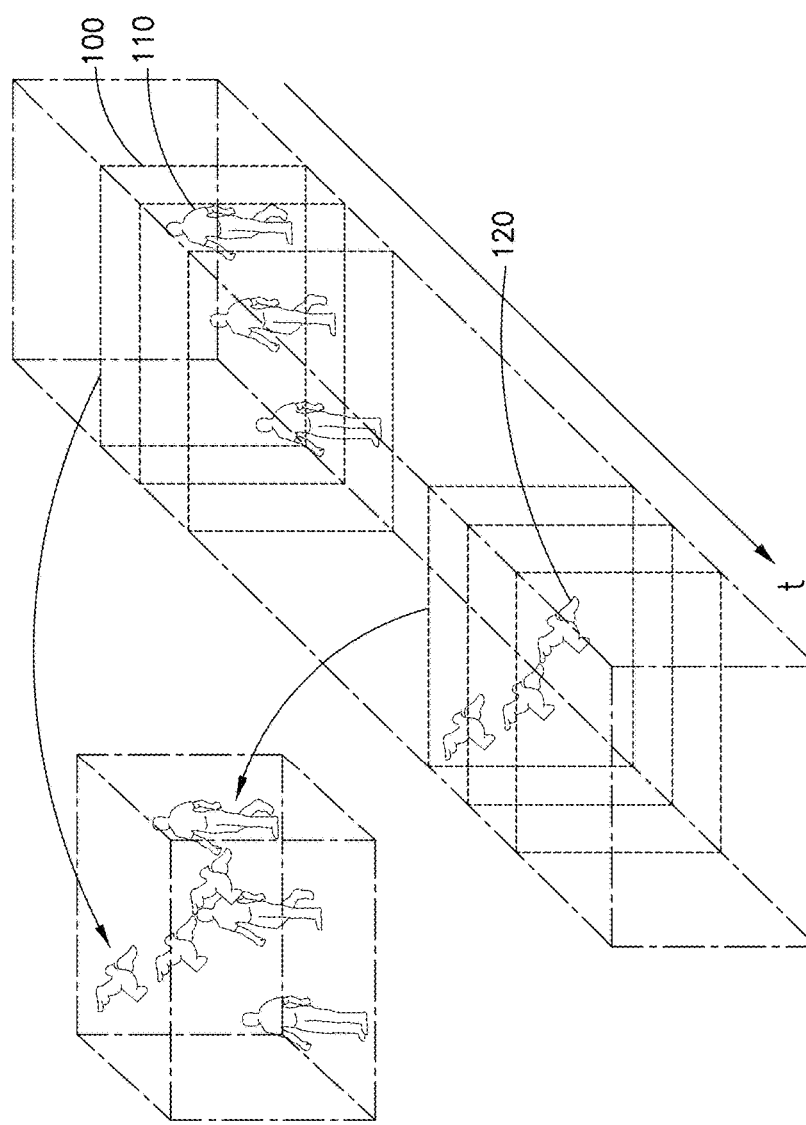
FIG. 1 depicts dynamic space and time domain video summarization based on motive objects.

FIG. 1 depicts a dynamic video summarization based on motive objects, which can reconstruct the motive objects in the time and space domain. In one set of video frames 100 taken at a series of points in the time domain, a person 110 is moving in the space domain relative to a fixed background. In another set of video frames, a bird 120 is moving in the space domain in a series of time domain images relative to a fixed background. The person 110 and the bird 120 are referred to as foreground objects or motive objects. They can be superimposed on a single background frame to form a video abstract, assuming the background has not changed significantly over the time frame in question.

The disclosed embodiments provide a solution based on signed foreground extraction and fusion (S-FEF) and use of a graphics processing unit (GPU). In this solution, S-FEF is used to extract and merge the foreground to reduce the influence of shadows, and a GPU is used to accelerate background updating.

Figure 2:
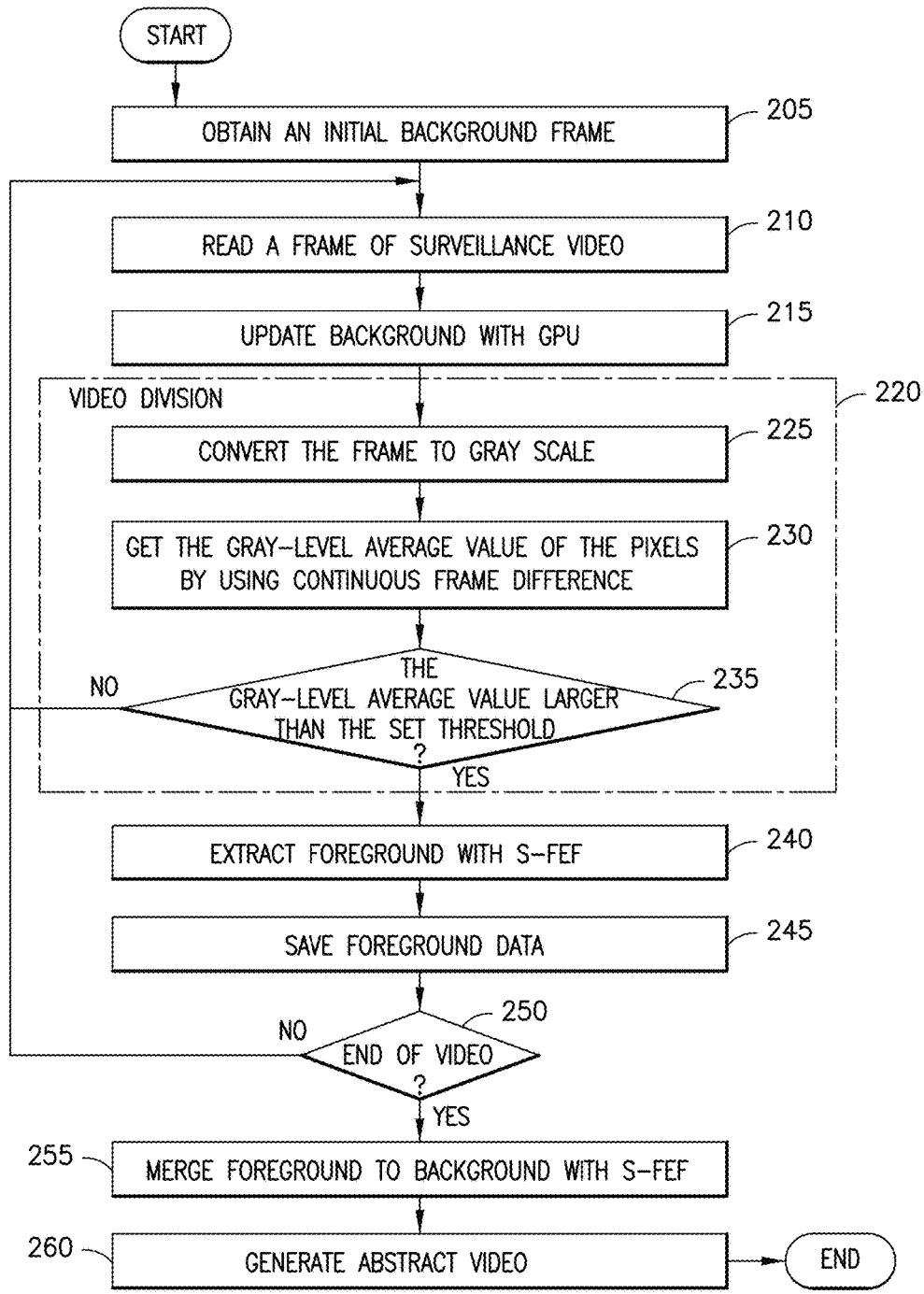
FIG. 2 is a flow diagram of a method for producing a video abstract from video using signed foreground extraction and fusion (S-FEF) with calculations performed using a graphics processing unit (GPU)

A flow diagram for generating a surveillance video abstract based on S-FEF and using a GPU is shown in FIG. 2.

First, an initial background is obtained by choosing a frame of background without any moving objects from the start of surveillance video (step 205). This background will be updated (step 215) with the necessary changes over time, e.g., changes due to variations in light throughout a day and night.

A frame of the surveillance video is read using, e.g., an application program interface (API) such as Open Source Computer Vision Library ("OpenCV") to decode and read the surveillance video. OpenCV is an open source, cross-platform computer vision library (step 210).

The next steps relate to a video division process 220 based on the gray-level average value of the pixels obtained using a continuous frame difference method. In the video division process, a video frame is converted from red-green-blue (RGB) space to gray space (e.g., 256 gray levels) (step 225). The $n^{th}$ gray scale frame is subtracted from the $(n+1)^{th}$ gray scale frame of the video and the absolute value of the result for each pixel is obtained (step 230), in accordance with formula (1). An average value is then determined for the gray scale pixels resulting from the difference calculation, as shown in formula (2).

$$\text{diff\_fgray}_n[i][j] = |\text{fgray}_{n+1}[i][j] - \text{fgray}_n[i][j]| \quad (1)$$

$$\text{Ave}_n = (\Sigma_{i=0}^{R-1} \Sigma_{j=0}^{C-1} \text{diff\_fgray}_n[i][j])/(R*C) \quad (2)$$

In formula (1), $\text{fgray}_n[i][j]$ represents the gray value of pixel(i,j) at the $n^{th}$ frame, $\text{fgray}_{n+1}[i][j]$ represents the gray value of pixel(i,j) at the $(n+1)^{th}$ frame, $\text{diff\_fgray}_n[i][j]$ represents the absolute value of pixel(i,j) after the difference between $n^{th}$ frame and $(n+1)^{th}$ frame. In formula (2), R represents the number of pixel rows of the video frame, C represents the number of pixel columns of the video frame, $\text{Ave}_n$ is the average value of the gray scale pixels resulting from the difference calculation between the $n^{th}$ frame and the $(n+1)^{th}$ frame.

The average grayscale differential computed in accordance with formula (2) is compared to a defined threshold (step 235). If the average grayscale differential does not exceed the threshold, then another frame of the surveillance video is read and subjected to the background updating and video division processes. If, on the other hand, the average grayscale differential exceeds the defined threshold, then the foreground data is extracted (step 240) and saved (step 245) before another frame of the surveillance video is read. The calculations necessary to perform the background update (step 215) require substantial computer resources. Therefore, as explained in further detail below, the graphics processing unit (GPU) may be used to perform these calculations to improve performance and efficiency.

In disclosed embodiments, the background is updated using a single Gaussian model using the GPU to perform the calculation (step 215). The single Gaussian model is suitable for updating a relatively stable background. Under this model, it is assumed that each position in the image is independent of every other and the pixel values of each point are Gaussian distributions, e.g., as shown formula (3):

$$p(x_{ij}) = \frac{1}{\sqrt{2\pi\sigma_{ij}^2}} \exp\left[-\frac{(x_{ij} - \mu_{ij})^2}{2\sigma_{ij}^2}\right] \quad (3)$$

In formula (3), $x_{ij}$ represents the gray value of the pixel whose coordinates are (i, j); $\mu_{ij}$ represents the average gray value of pixel (i,j); $\sigma^2_{ij}$ represents the variance of pixel (i,j); $p(x_{ij})$ represents the probability of pixel (i,j). When the probability of a pixel is less than the set threshold, it is considered to be a background point, otherwise it is considered to be a foreground point.

When the scene in a surveillance video changes, such as, for example, due to changes in lighting conditions, motive objects, etc., the Gaussian model can update the background based on such changes of condition using formula (4):

$$B^t = \alpha I^t + (1-\alpha)B^{t-1} \quad (4)$$

In formula (4), the update coefficient is $\alpha$, $B^t$ represents the current background, $B^{t-1}$ represents the background of the previous frame, and $I^t$ represents the current input image.

To update the background using the single Gaussian model (step 215), the following parameters are initialized: $\alpha$, $\lambda$, and $\theta[i][j]$, where $\alpha$ represents updating speed, $\lambda$ represents threshold parameters, and $\theta[i][j]$ represents the variance of each pixel between frame and background.

The video frame and the corresponding background frame are converted to a signed data. Then, the absolute value of the difference between the video frame and the corresponding background, is calculated using formula (5):

$$\text{sub}[i][j] = |f[i][j] - b[i][j]| \quad (5)$$

In formula (5), f[i][j] represents the signed data value of each pixel in a video frame, b[i][j] represents the signed data value of each pixel in a corresponding background.

If the computed differential for a particular background pixel, $b^{t-1}[i][j]$, is less than a threshold, in accordance with $\text{sub}[i][j] < \lambda * \theta[i][j]$, then the background is updated for that pixel as follows:

$$b^t[i][j] = \alpha * f[i][j] + (1-\alpha) * b^{t-1}[i][j] \quad (6)$$

In formula (6), f[i][j] represents the signed data value of each pixel in video frame, $b^{t-1}[i][j]$ represents the signed data value of each pixel in background before being updated, $b^t[i][j]$ represents the signed data value of each pixel in background after being updated, and $\alpha$ is a parameter representing an updating speed, as noted above. In this manner, the background is updated on a pixel-by-pixel basis.

If, on the other hand, the computed differential, sub[i][j], for a particular background pixel, $b^{t-1}[i][j]$, is greater than a threshold, according to $\text{sub}[i][j] < \lambda * \theta[i][j]$, then the pixel is considered to be a foreground point.

Based on the updated background, the parameter representing the variance between frame and background pixels, $\theta[i][j]$, is also updated, as follows:

$$\theta^t[i][j] = \sqrt{(1-\alpha) * \theta^{t-1}[i][j] + \alpha * (f[i][j] - b^t[i][j])^2} \quad (7)$$

In formula (7), f[i][j] represents the signed data value of each pixel in the video frame, $b^t[i][j]$ represents the signed data value of each pixel in the background after updating, $\theta^{r-1}[i][j]$ represents the value of the variance parameter before updating, and $\theta^r[i][j]$ represents the value of the variance parameter after updating.

Figure 12:
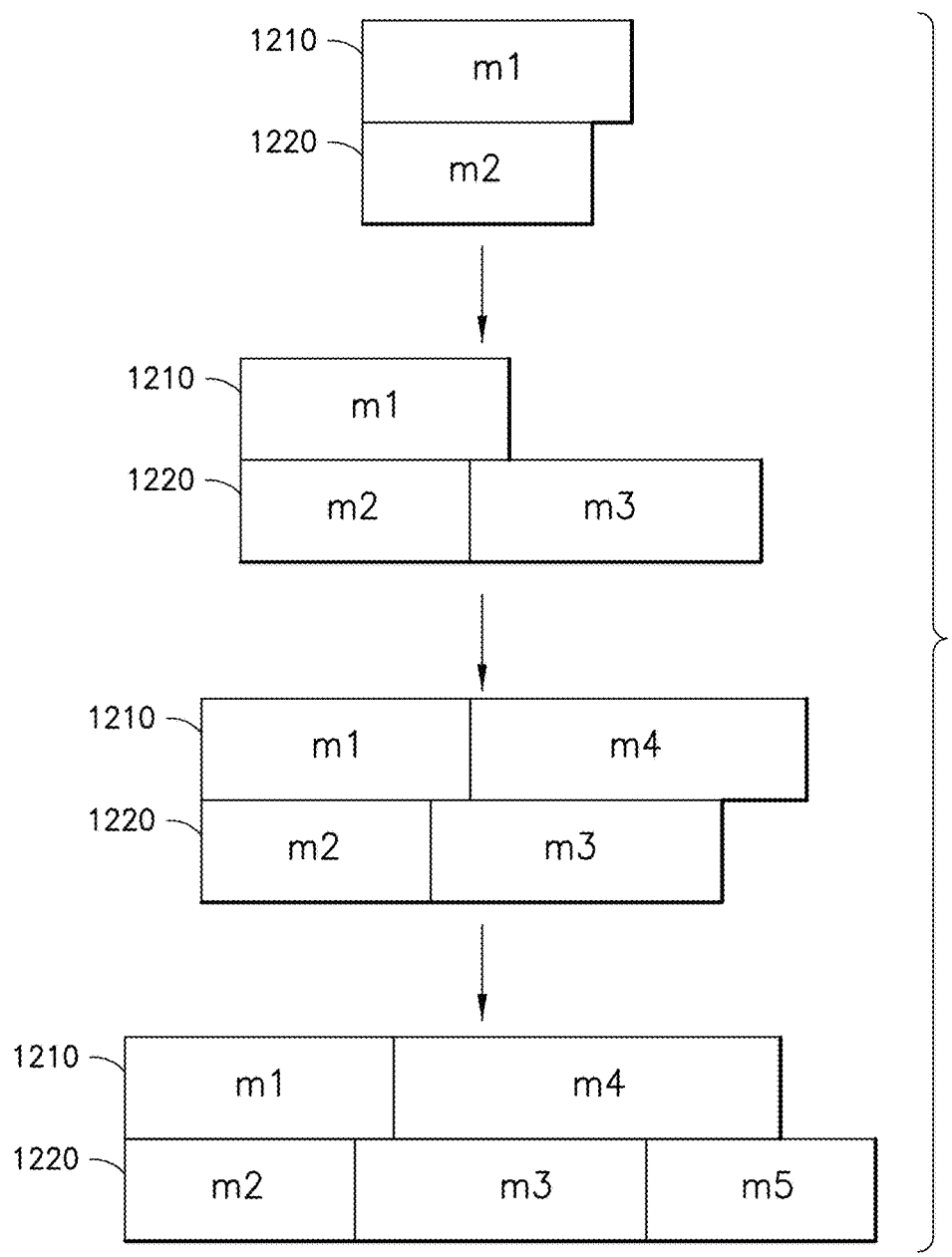
FIG. 12 depicts a process for combining the motive segments of a video to form a compressed video abstract.

After the extraction (step 240) and saving (step 245) of the foreground data, it is determined whether the end of the video has been reached (step 250). If the end of the video has been reached, the foreground data is merged with the background (step 255) in a process discussed below (see FIG. 9A) and the video abstract is generated (step 260) in a process discussed below (see FIGS. 7, 8, and 12). If it is determined that the end of the video has not been reached (step 250), another frame of video is read (step 205), the background is updated (215), and the video division process 220 is repeated.

Figure 3:
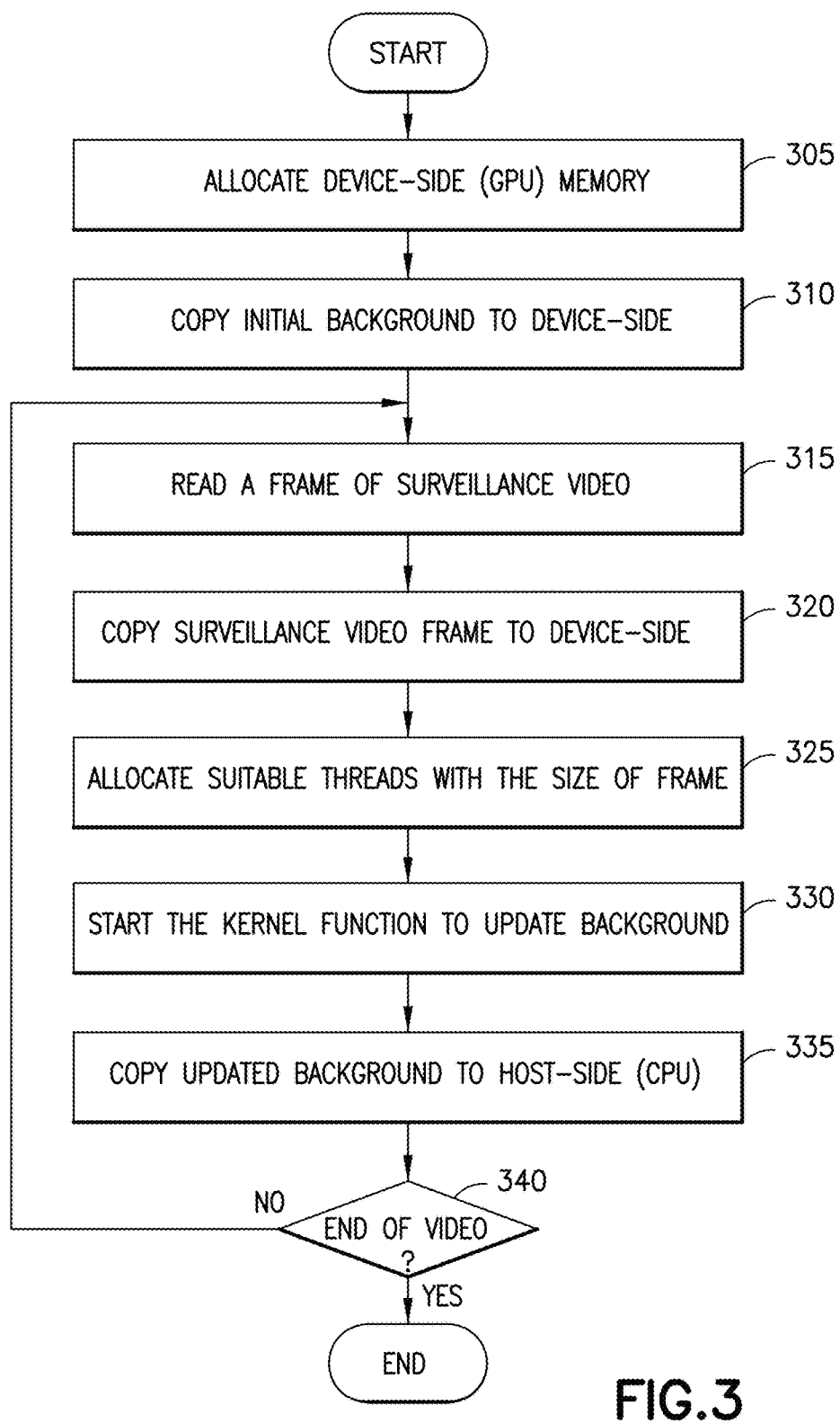
FIG. 3 is a flow diagram of a method for updating background frames of a video summary using a GPU.

As noted above, the background update calculations require substantial computer resources. Therefore, the GPU is used to perform these calculations to improve performance and efficiency. Specifically, as depicted in FIG. 3, the GPU is used to provide parallel processing of the background updating using the single Gaussian model.

The memory of the GPU, which may be generally referred to as the "GPU-side memory" or "device-side" memory, is allocated to store particular data (step 305). For example, GPU-side memory is allocated for the frame-background variance parameter, $\theta[i][j]$, with the data type "signed" and an array of size Sz.

$$Sz = R*C \qquad (8)$$

In formula (8), R represents the number of rows of the video frame in pixels and C represents the number of columns of the video frame in pixels.

GPU-side memory is allocated for the video frame, with the data type being "unsigned char" and the array size being Sz. GPU-side memory is similarly allocated for the background frame.

After the GPU memory has been allocated (step 305), the initial background is copied to its allocated portion of the device-side memory (step 310). This is done as part of the step of obtaining an initial background frame, as shown, e.g., in FIG. 2.

After the initialization described above, the GPU is used to perform the background updating calculations. As shown, for example, in FIG. 2, the background updating process is performed when the average gray scale level of a frame of the video exceeds a threshold. The background updating calculations may be performed repeatedly during the video division process (see FIG. 2) whenever this condition is true.

A step of reading a frame of surveillance video (step 315) is presented in FIG. 3 as the first step in the background calculation loop. In practice, the frame being read is the most recent frame to undergo the video division process depicted in FIG. 2, i.e., it is a video frame having an average gray level value that exceeds the defined threshold. The frame which is read in this step is copied to the device-side memory (i.e., the memory of the GPU) (step 320).

A suitable number of GPU processing threads are allocated depending upon the size of the frame (step 325). For example, if a frame size is m columns by n rows, with c channels (e.g., the three color channels, red, green, and blue, of an RGB image), then the number of threads allocated may be m×n×c, which would provide for each pixel to have a thread for each of its RGB components. A kernel function is started to perform the background update calculations (step 330), which are described above.

The resulting updated background is copied back to the host side (i.e., the memory of the CPU) (step 335) and the video division process (see FIG. 2) continues unless the end of the video is reached. An "end of video?" decision (step 340) also occurs in the background updating calculation (see FIG. 3) in case the end of the video is reached during that process.

Experiments were conducted to confirm the acceleration of processing speed which is obtained by using the GPU to perform background updating calculations. As shown in FIG. 4, five surveillance videos were studied with various frame rates and sizes. In the experiment, the central processing unit (CPU) model was Intel Core i5 4690K and the GPU model was NVIDIA GeForce GTX 960. The CPU and GPU were used to calculate background updates using the single Gaussian model discussed above. The times for the CPU and the GPU to calculate a background update for each of the five example videos is shown in FIG. 5 and graphically represented in FIG. 6. In FIG. 5, Tc represents the time CPU cost; Tg represents the time GPU cost; and Sr represents the "speedup ratio," which is calculated by formula (9) as follows:

$$Sr = Tc/Tg \qquad (9)$$

Figure 6:
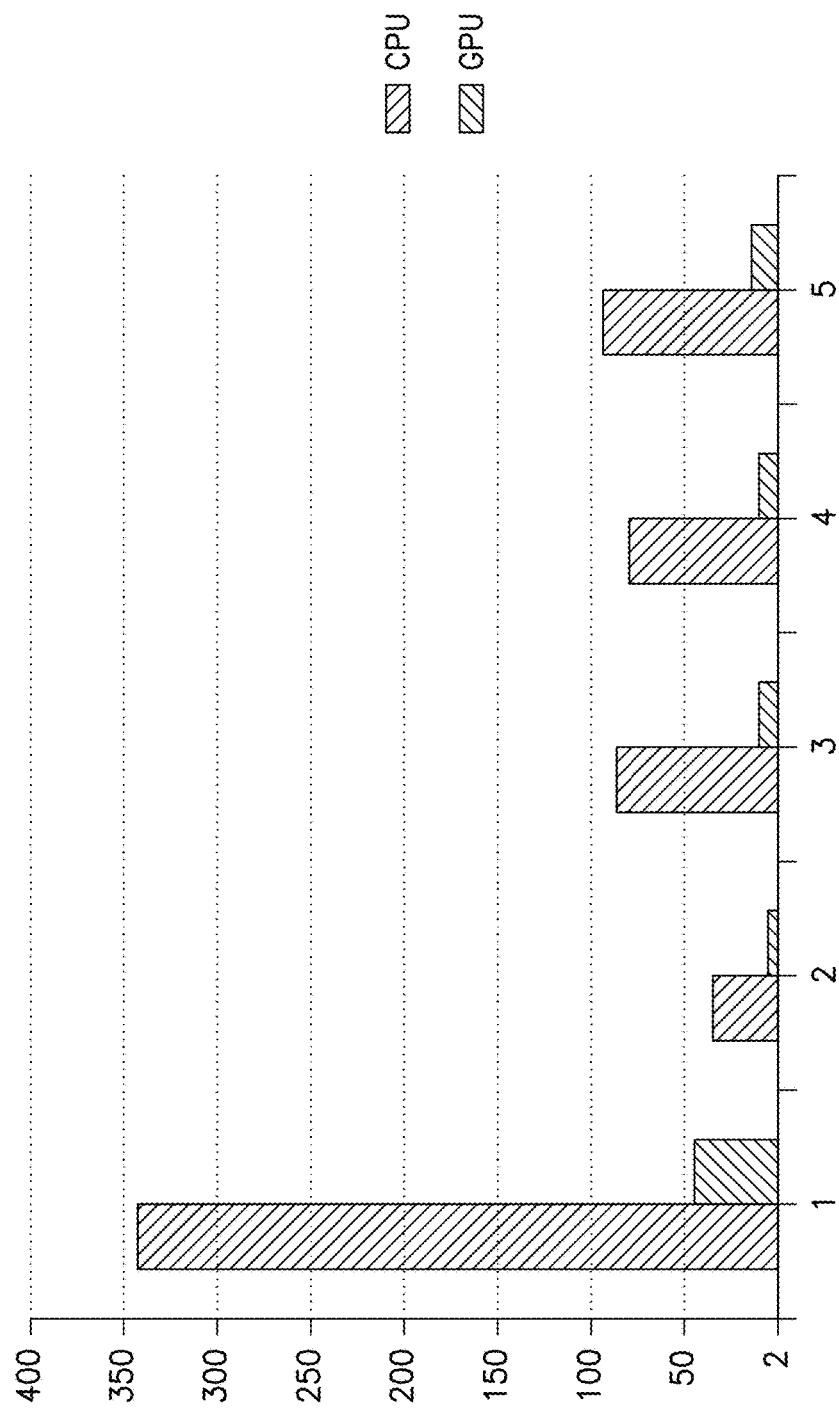
FIG. 6 is a chart depicting GPU and CPU time use in the experiments using the videos of FIG. 4.

From FIGS. 4-6, it can be seen that after GPU parallelization, the calculation speed of single Gaussian model can be greatly increased. By reducing the time consumed by the single Gaussian model, which is performed for each and every video frame, the time required for video digest generation is shortened, thereby significantly speeding up the generation of video summary.

In general, only the dynamic parts of a surveillance video are of interest, i.e., frames which contain moving objects, which may be referred to as "motive frames". Motive frames can be detected by determining whether a significant change has occurred with respect to the previous frame.

As shown in FIG. 7, a surveillance video will generally include dynamic, i.e., motive, segments (m1, m2, m3 . . . ) and static segments (s1, s2, s3 . . . ). In disclosed embodiments, the average gray scale level of the frames can be used to detect significant changes between frames. As discussed above, formula (2) can be used to determine the average gray scale level differential from one frame to the next, $Ave_n$. A threshold, Tm, can be applied to the calculated average differential (see FIG. 2). If $Ave_n$ is less than Tm, then frame n is considered to be a static segment and will be dropped. If $Ave_n$ is greater than Tm, then frame n is considered to be a motive segment and will be maintained. In this way, the surveillance video is divided into a number of motive segments, as shown in FIG. 8.

After the surveillance has been reduced to a series of motive segments, it is desirable to isolate the particular portions of the motive segments which include moving objects. In short, the extraction of the moving objects is done by subtracting from each motive frame its corresponding background. The isolated moving objects are then fused with, i.e., superimposed on, a particular background.

Typically, the data type of video frame is unsigned char, i.e., values in the form of character data without an indication of positive or negative. In subtraction between foreground and background, values smaller than zero are dropped, which results in some information being lost. By contrast, in the disclosed embodiments, the extraction of the moving objects is done using signed foreground extraction and fusion (S-FEF) to preserve as much information as possible. When performing foreground/background subtraction, the data of the video frames is converted to signed type, thereby preventing the loss of negative subtraction results. Preserving this additional information results in a higher quality video abstract.

Figure 9A:
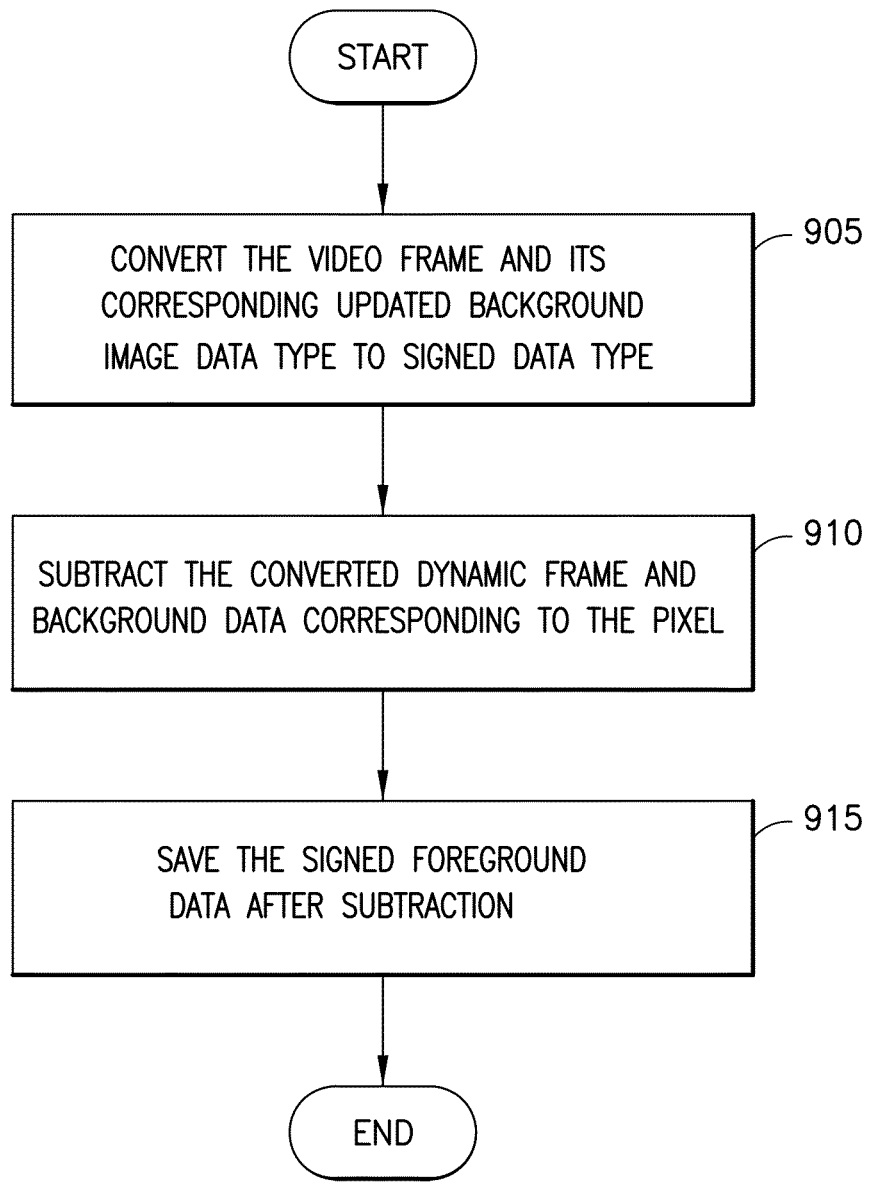
FIGS. 9A and 9B are flow diagrams of extraction and fusion, respectively, of the motive objects of a video using S-FEF.

As shown in FIG. 9A, the S-FEF extraction process converts the video frame and its corresponding updated background image data type to signed integers (step 905). The process then subtracts the converted motion frame and background data on a pixel-by-pixel basis, which results in motion foreground data (step 910). This foreground data is saved (step 915) for use in the fusion portion of the process, which is discussed below. In disclosed embodiments, the subtraction of background from foreground is done according to formula (10):

$$\text{fore}_s[i][j] = f_s[i][j] - \text{back}_s[i][j] \qquad (10)$$

In formula (10), $f_s[i][j]$ represents the signed value of motion frame, $\text{back}_s[i][j]$ represents the signed value of corresponding background, and $\text{fore}_s[i][j]$ represents the signed foreground value.

Figure 9B:
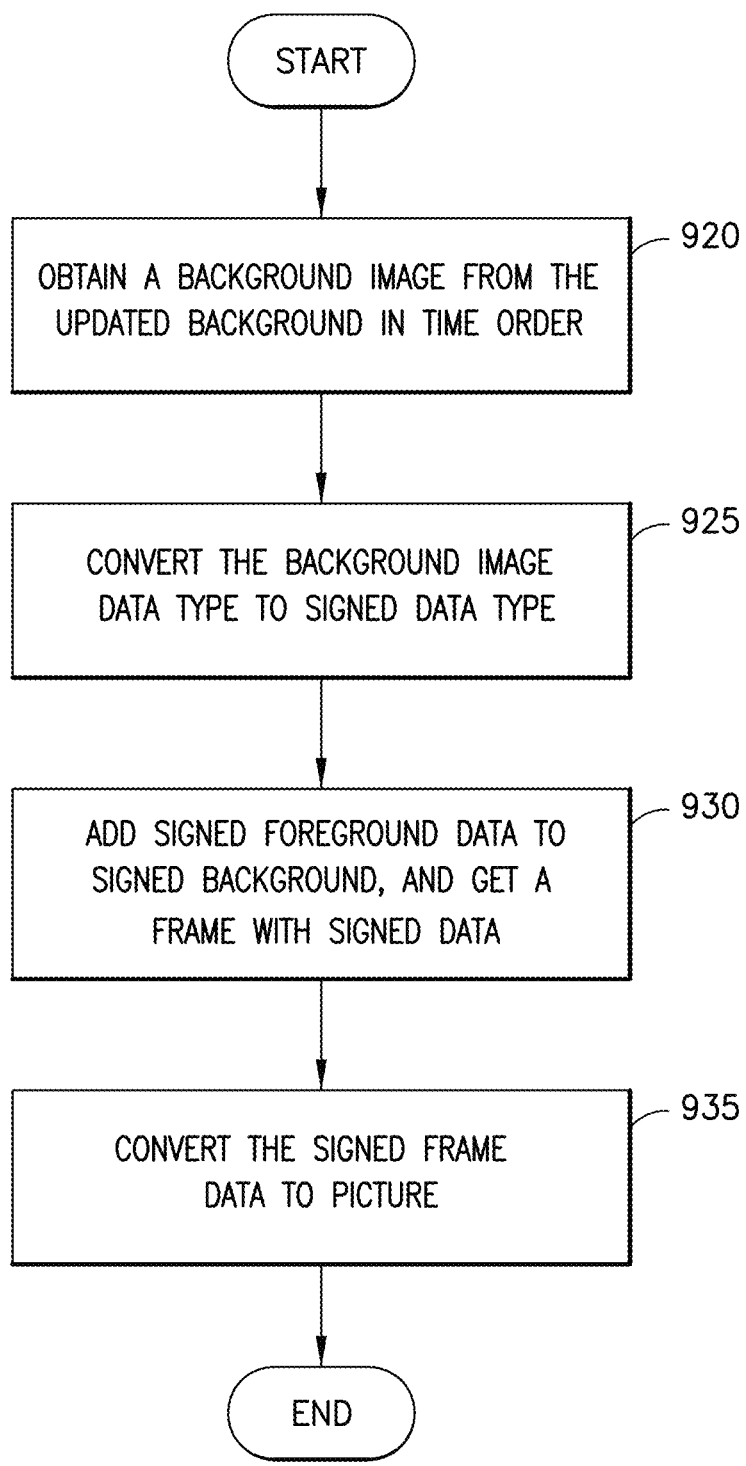

As shown in FIG. 9B, the signed foreground data obtained in the extraction process is fused to corresponding backgrounds obtained in the background updating process (see FIGS. 2 and 3) to form a video abstract. A background image, i.e., frame, is obtained in time order from a set of updated background (step 920). The background frame data is converted to a signed data type (step 925). In disclosed embodiments, the fusion of the foreground and background is done by adding the signed foreground data to the signed background data (step 930), which results in a frame with signed data, according to formula (11):

$$f_{as}[i][j] = \text{fore}_{as}[i][j] + \text{back}_{as}[i][j] \qquad (11)$$

In formula (11), $\text{fore}_{as}[i][j]$ is the signed pixel values of the foreground to be fused, $\text{back}_{as}[i][j]$ is the signed pixel values of background to be fused, and $f_{as}[i][j]$ is the signed pixel values of the fused frame. The signed pixel values of a fused frame, $f_{as}[i][j]$, are converted to unsigned char data type to get a merged frame of the video abstract (step 935).

FIG. 10 shows the result of an experiment performed using a surveillance video which was processed to form a video abstract frame without using S-FEF. By contrast, FIG. 11 shows the result of an experiment performed using a surveillance video which was processed to form a video abstract frame using the extraction and fusion of foreground by S-FEF. As can be seen in FIG. 10, extracting and fusing foreground without using S-FEF may result in the formation of a significant border shadow, which has a substantial adverse effect on the quality of the video abstract. The use of the S-FEF method in the example of FIG. 11, by contrast, eliminated the influence of boundary shadow, thereby substantially improving the quality of video abstract.

As discussed above, the surveillance video is divided into motive segments, i.e., dynamic segments. These segments are combined according to particular rules to form the video abstract. In disclosed embodiments, a compression method may be used in which a compression factor, C, is set to an integer value: 1, 2, 3, . . . etc. In this method, C parts of motive segments can be used to generate abstract video at the same time. For example, if C=2, then we can get a video abstract can be formed according to the process depicted in FIG. 12. In this example, two sequences of motive segments (1210 and 1220) will be used to generate the video abstract at the same time. Therefore, there are two lines of motive segments to which each subsequent segment can be added to generate a video abstract while maintaining the time order of the motive segments. Each additional segment, after m1 and m2, is added to the shorter sequence. For example, motive segment m2 is shorter than m1, so the next segment, m3, is added following m2. This process is continued until a complete video abstract is formed.

In view of the above, it can be seen that disclosed embodiments use S-FEF to prevent border shadow and use the GPU to perform parallel computing for the background updating algorithm using a single Gaussian model to substantially speed up the calculations. Because the background updating usually takes up a significant amount of time, generation of the video abstract can be significantly accelerated using such methods. Thus, the disclosed embodiments allow one to obtain a surveillance video abstract faster and of higher quality which, in turn, can effectively reduce the video storage requirements.

Embodiments described herein are solely for the purpose of illustration. Those in the art will recognize other embodiments may be practiced with modifications and alterations to that described above.

What is claimed is:

1. A method for producing a video abstract from video produced by a surveillance video camera, the method comprising:
   retrieving a frame of the video produced by the camera;
   updating a background frame based at least in part on the retrieved frame;
   performing a video division process to separate static frames from motive frames, the video division process comprising:
      retrieving, if it is determined that the retrieved frame is a static frame, a next frame of the video produced by the camera, updating the background frame, and repeating the video division process; and
      extracting, if it is determined that the retrieved frame is a motive frame, foreground data from the retrieved frame after conversion of the retrieved frame to a signed data type;
   determining whether an end of the video produced by the camera has been reached;
   retrieving, if it is determined that the end of the video produced by the camera has not been reached, a next frame of the video produced by the camera, updating the background frame, and repeating the video division process;
   merging, if it is determined that the end of the video produced by the camera has been reached, the foreground data with the updated background data by:
      retrieving updated background frames in time order;
      converting the updated background frames to a signed data type;
      adding the foreground data to corresponding background frames of the converted updated background frames; and
   converting the added frames from signed data type to an unsigned character data type to generate a video abstract with the merged foreground and background data.

2. The method of claim 1, wherein:
   the retrieved frame is determined to be a static frame if it is determined that an average gray scale value of the retrieved frame does not exceed a defined threshold, and
   the retrieved frame is determined to be a motive frame if it is determined that the average gray scale value of the retrieved frame exceeds the defined threshold.

3. The method of claim 2, wherein the determining of whether the average gray scale value exceeds the defined threshold comprises:

converting the retrieved frame to a gray scale;
determining a difference matrix for pixels of the retrieved frame minus corresponding pixels of a previous frame from the camera; and
determining an average gray scale value of the difference matrix.

4. The method of claim 1, wherein the updating of the background frame comprises:
allocating memory in a graphics processor unit (GPU);
copying an initial background frame to the GPU from a central processing unit (CPU);
copying a frame of the video produced by the camera to the GPU;
allocating processing threads of the GPU based at least in part on the size of the frame of video;
starting a kernel function to update the initial background frame; and
copying the updated background frame to the CPU.

5. The method of claim 1, wherein the updating of the background frame comprises:
converting the retrieved video frame and an initial background frame to a signed data type;
determining a differential matrix equal to an absolute value of pixel values of the retrieved video frame minus corresponding pixel values of the initial background frame;
determining whether each pixel value of the differential matrix is less than a defined variance threshold; and
producing an updated background frame according to the following equation, for pixels for which it is determined that corresponding pixel values of the differential matrix are less than the defined variance threshold:

$$b^t[i][j]=\alpha*f[i][j]+(1-\alpha)*b^{t-1}[i][j],$$

where f[i][j] is the converted retrieved video frame, $b^{t-1}[i][j]$ is the converted initial background frame, $b^t[i][j]$ is the updated background frame, and α is the speed factor.

6. The method of claim 5, wherein the determined variance threshold is a matrix of values and the method further comprises updating the variance threshold according to the following equation:

$$\theta^t[i][j]=\sqrt{(1-\alpha)*\theta^{t-1}[i][j]+\alpha*(f[i][j]-b^t[i][j])^2},$$

where f[i][j] is the converted retrieved video frame, $b^t[i][j]$ is the updated background frame, α is the speed factor, $\theta^{t-1}[i][j]$ is the variance threshold matrix before updating, and $\theta^t[i][j]$ is the variance threshold matrix after updating.

7. The method of claim 1, wherein the extracting of the foreground data from the retrieved frame comprises:
converting the retrieved video frame and a corresponding background frame to a signed data type; and
producing foreground data by subtracting the converted background frame from the converted retrieved video frame.

8. A system for producing a video abstract from video produced by a video camera, the system comprising a central processing unit (CPU) and a graphics processing unit (GPU), the CPU and GPU being configured to perform a method comprising:
retrieving a frame of the video produced by the camera;
updating a background frame based at least in part on the retrieved frame;
performing a video division process to separate static frames from motive frames, the video division process comprising:

retrieving, if it is determined that the retrieved frame is a static frame, a next frame of the video produced by the camera, updating the background frame, and repeating the video division process; and
extracting, if it is determined that the retrieved frame is a motive frame, foreground data from the retrieved frame after conversion of the retrieved frame to a signed data type;
determining whether an end of the video produced by the camera has been reached;
retrieving, if it is determined that the end of the video produced by the camera has not been reached, a next frame of the video produced by the camera, updating the background frame, and repeating the video division process;
merging, if it is determined that the end of the video produced by the camera has been reached, the foreground data with the updated background data by:
retrieving updated background frames in time order;
converting the updated background frames to a signed data type;
adding the foreground data to corresponding background frames of the converted updated background frames; and
converting the added frames from signed data type to an unsigned character data type to generate a video abstract with the merged foreground and background data.

9. The system of claim 8, wherein:
the retrieved frame is determined to be a static frame if it is determined that an average gray scale value of the retrieved frame does not exceed a defined threshold, and
the retrieved frame is determined to be a motive frame if it is determined that the average gray scale value of the retrieved frame exceeds the defined threshold.

10. The system of claim 9, wherein the determining of whether the average gray scale value exceeds the defined threshold comprises:
converting the retrieved frame to a gray scale;
determining a difference matrix for pixels of the retrieved frame minus corresponding pixels of a previous frame from the camera; and
determining an average gray scale value of the difference matrix.

11. The system of claim 8, wherein the updating of the background frame comprises:
allocating memory in the GPU;
copying an initial background frame to the GPU from the CPU;
copying a frame of the video produced by the camera to the GPU;
allocating processing threads of the GPU based at least in part on the size of the frame of video;
starting a kernel function to update the initial background frame; and
copying the updated background frame to the CPU.

12. The system of claim 8, wherein the updating of the background frame comprises:
converting the retrieved video frame and an initial background frame to a signed data type;
determining a differential matrix equal to an absolute value of pixel values of the retrieved video frame minus corresponding pixel values of the initial background frame;
determining whether each pixel value of the differential matrix is less than a defined variance threshold; and producing an updated background frame according to the following equation, for pixels for which it is determined that corresponding pixel values of the differential matrix are less than the defined variance threshold:

$$b^r[i][j]=\alpha * f[i][j]+(1-\alpha)*b^{r-1}[i][j],$$

where f[i][j] is the converted retrieved video frame, $b^{r-1}[i][j]$ is the converted initial background frame, $b^r[i][j]$ is the updated background frame, and α is the speed factor.

13. The system of claim 12, wherein the determined variance threshold is a matrix of values and the method further comprises updating the variance threshold according to the following equation:

$$\theta^r[i][j]=\sqrt{(1-\alpha)*\theta^{r-1}[i][j]+\alpha*(f[i][j]-b^r[i][j])^2},$$

where f[i][j] is the converted retrieved video frame, $b^r[i][j]$ is the updated background frame, α is the speed factor, $\theta^{r-1}[i][j]$ is the variance threshold matrix before updating, and $\theta^r[i][j]$ is the variance threshold matrix after updating.

14. The system of claim 8, wherein the extracting of the foreground data from the retrieved frame comprises:
converting the retrieved video frame and a corresponding background frame to a signed data type; and
producing foreground data by subtracting the converted background frame from the converted retrieved video frame.

15. A method for producing a video abstract from video produced by a surveillance video camera, the method comprising:
retrieving a frame of the video produced by the camera;
updating a background frame based at least in part on the retrieved frame;
performing a video division process to separate static frames from motive frames, the video division process comprising:
retrieving, if it is determined that the retrieved frame is a static frame, a next frame of the video produced by the camera, updating the background frame, and repeating the video division process; and
extracting, if it is determined that the retrieved frame is a motive frame, foreground data from the retrieved frame after conversion of the retrieved frame to a signed data type;
determining whether an end of the video produced by the camera has been reached;
retrieving, if it is determined that the end of the video produced by the camera has not been reached, a next frame of the video produced by the camera, updating the background frame, and repeating the video division process;
merging, if it is determined that the end of the video produced by the camera has been reached, the foreground data with the updated background data after conversion of the foreground data and the updated background data to the signed data type; and
generating a video abstract with the merged foreground and background data,
wherein the updating of the background frame comprises:
converting the retrieved video frame and an initial background frame to a signed data type;
determining a differential matrix equal to an absolute value of pixel values of the retrieved video frame minus corresponding pixel values of the initial background frame;
determining whether each pixel value of the differential matrix is less than a defined variance threshold; and
producing an updated background frame for pixels for which it is determined that corresponding pixel values of the differential matrix are less than the defined variance threshold, the producing being based at least in part on the converted retrieved video frame, the converted initial background frame, and a speed factor.

16. A system for producing a video abstract from video produced by a video camera, the system comprising a central processing unit (CPU) and a graphics processing unit (GPU), the CPU and GPU being configured to perform a method comprising:
retrieving a frame of the video produced by the camera;
updating a background frame based at least in part on the retrieved frame;
performing a video division process to separate static frames from motive frames, the video division process comprising:
retrieving, if it is determined that the retrieved frame is a static frame, a next frame of the video produced by the camera, updating the background frame, and repeating the video division process; and
extracting, if it is determined that the retrieved frame is a motive frame, foreground data from the retrieved frame after conversion of the retrieved frame to a signed data type;
determining whether an end of the video produced by the camera has been reached;
retrieving, if it is determined that the end of the video produced by the camera has not been reached, a next frame of the video produced by the camera, updating the background frame, and repeating the video division process;
merging, if it is determined that the end of the video produced by the camera has been reached, the foreground data with the updated background data after conversion of the foreground data and the updated background data to the signed data type; and
generating a video abstract with the merged foreground and background data,
wherein the updating of the background frame comprises:
converting the retrieved video frame and an initial background frame to a signed data type;
determining a differential matrix equal to an absolute value of pixel values of the retrieved video frame minus corresponding pixel values of the initial background frame;
determining whether each pixel value of the differential matrix is less than a defined variance threshold; and
producing an updated background frame for pixels for which it is determined that corresponding pixel values of the differential matrix are less than the defined variance threshold, the producing being based at least in part on the converted retrieved video frame, the converted initial background frame, and a speed factor.

* * * * *